March 7, 1967 R. W. HARTER 3,307,583
VALVE ACTUATING MEANS
Filed May 1, 1964
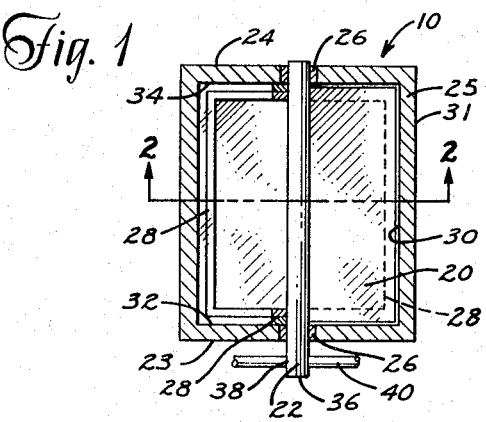
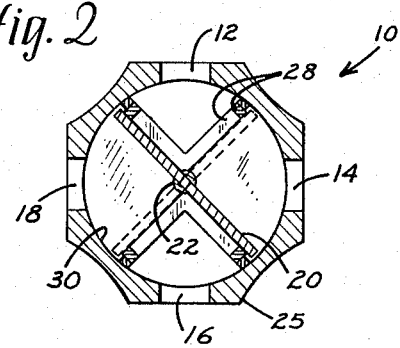
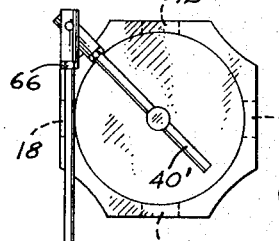
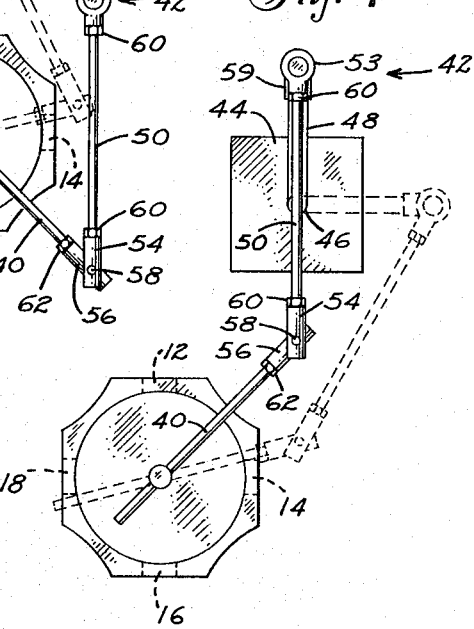
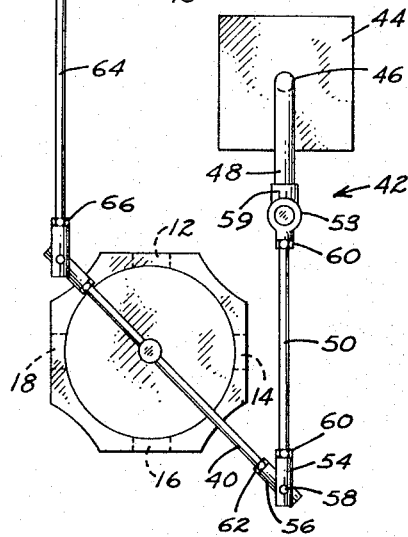
INVENTOR
RUSSELL W. HARTER
BY *Laurence R Hefter*
ATTORNEY

# United States Patent Office 3,307,583
Patented Mar. 7, 1967

3,307,583
VALVE ACTUATING MEANS
Russell W. Harter, Springfield, Va., assignor to Atlantic Research Corporation, Fairfax, Va., a corporation of Virginia
Filed May 1, 1964, Ser. No. 364,139
11 Claims. (Cl. 137—625.43)

This invention relates to valve actuating means and more particularly, to a rotary valve actuating linkage system.

In the past actuating means for rotary valves of the type whose face abuts a valve seat, for example, valves as illustrated in Patent 2,365,927 and Patent 2,946,554, have been intricate and expensive and, furthermore, have often failed to provide the necessary force required for effective sealing at the moment of seating of the valve member. Also the prior art means often fail to provide the necessary starting torque needed to break certain seals. When a reversible motor or reverse gearing system is employed care must be taken to ensure stopping of the motor or system at the instant of seating, otherwise continued operation results in the stressing or even failing of the valve and valve actuating means. Where a continuously rotating motor is employed as a power source either the closing force on the valve during seating of the valve is insufficient to provide the desired sealing, or the motor is over-designed with respect to the non-seating portion of the valve actuating cycle where the valve member is rotating from one sealing position to a second sealing position in order to be properly designed for the instant of seating of the valve member.

It is desirable for the valve actuating system to be operated by a continuously rotating or reversible motor and to magnify the applied torque of the motor at the instant of valve seating and unseating so that a motor having minimum power output can be utilized.

Accordingly, it is one object of the present invention to provide a valve actuating means capable of being driven by a continuously rotating or reversible motor and which applies maximum force to the valve at the instant of seating and unseating.

It is another object of the present invention to provide a valve actuating means operated by a continuously rotating or reversible motor which applies maximum force to the valve at the instant of seating and unseating, the maximum force being applied twice per motor revolution.

It is a still further object of the present invention to provide a valve actuating means which is relatively uncomplicated, inexpensive to produce, easy to assemble, and adjustable to ensure accurate seating of the valve during extended operating conditions and to permit variation in the length of valve travel.

Further objects and attendant advantages of the present invention will become better understood from the following description.

Briefly stated, this invention, in one form, provides a valve actuating means comprising a crank operated by a rotatable motor means, a valve operating lever drivingly connected to a rotatable valve member and a connecting rod operatively coupling the crank and the valve operating lever. The orientation of the crank and connecting rod is such that at the moment of seating and unseating of the rotary valve member, which corresponds to a predetermined position of the valve operating lever, the center of rotation of the crank, the juncture between the crank and the connecting rod and the juncture between the connecting rod and the valve operating lever are co-linear. The torque applied to the valve operating lever approaches infinity when this co-linear position is achieved and, therefore, a motor having a relatively small output can be utilized for operating and closing the valve. By using a crank and connecting rod arrangement the co-linear position and, therefore, the point of maximum torque application to the valve operating lever occurs twice per motor means revolution, at 180° intervals. Accordingly, this arrangement is particularly adapted for use in a multi-port flow control valve having at least three ports.

While the specification concludes with claims particularly pointing out and distinctly claiming the subject matter which is regarded as the invention, it is believed that the invention will become better understood from the following description taken in combination with the accompanying drawing in which the same numerals are used to designate corresponding parts.

FIGURE 1 schematically illustrates a valve of the type with which a valve actuating system formed in accordance with this invention is intended to be used.

FIGURE 2 is a cross-sectional view of the valve of FIGURE 1 taken along lines 2—2, the view having been rotated 45°.

FIGURE 3 is a schematic illustration of a valve actuating mechanism formed in accordance with the subject invention, shown in a first position (solid lines) wherein the valve is in a seated position and in a second position (dotted lines) wherein the valve is in an unseated position.

FIGURE 4 is a shematic illustration of a valve actuating mechanism, formed in accordance with the subject invention, shown in a third position (solid lines) wherein the valve is in a second seated position and in a fourth position (dotted lines) wherein the valve is in a second unseated position.

FIGURE 5 schematically illustrates a valve actuating mechanism formed in accordance with the subject invention utilized for actuating a pair of valves both of which are illustrated in a seated position.

The valve operating mechanism of the subject invention is intended to be used to actuate a valve of the type whose face abuts against a seating member in order to obturate a valve port or vary the direction of flow through a valve. One example of such a valve, shown in FIGURES 1 and 2, is a multi-port butterfly valve 10 shown as having four ports 12, 14, 16, 18. A rotating valve member or vane 20 is mounted for rotation on a valve shaft 22 which, in turn, is mounted within the end walls 23, 24 of the valve casing 25 by means of journal bearings 26.

Flow control through the multi-port valve 10 is accomplished through cooperation between the valve member 20 and a plurality of resilient sealing strips 28 fixedly attached to the inner surface 30 of the valve casing 25. The sealing strips 28 are mounted approximately centrally between adjacent ports and extend along the length of the casing wall 31 intermediate the end walls 23, 24 and extend transversely across the inner faces 32, 34 of the casing end walls 23, 24, respectively, extending inwardly toward the valve shaft 22, as may be seen in FIGURES 1 and 2. The strips thus form a sealing frame. The valve member 20 is formed as a plate or vane and is of such a size as to be larger than the orifice formed by the sealing members 28. When the valve member 20 is in a closed position, as illustrated in FIGURES 1 and 2, the valve member 20 abuts against the surface of the sealing members 28 and, due to the resiliency of the sealing members, the valve member is embedded slightly therein.

When the valve member 20 is in the position shown in FIGURE 2, flow communication exists between a first valve port 12 and a second valve port 14 and also between a third valve port 16 and a fourth port 18. Rotation of the valve member 20 through a 90° arc effects interruption of the flow communication between the first and second ports 12, 14, respectively, and between the third and fourth ports 16, 18, respectively, and effects flow communication between the first port 12 and fourth port 18 and between the second port 14 and third port 16, this position being illustrated by the dotted lines in FIGURE 2. To provide for operation of the valve member 20 one end 36 of the valve shaft 22 is provided with a recess or slot 38 extending transversely thereacross. Slideably received within the slot 38 is a valve operating lever 40. This arrangement permits relative sliding or transverse motion between the valve lever 40 and the shaft 22 while preventing relative rotational motion therebetween, thus effecting a rotary driving relationship between the lever 40 and shaft 22.

It can be seen that through the major part of the valve member's rotation the required operating force is minimal, however, at the extreme ends of the rotation, when the valve member 20 is seating against the sealing members 28, the force needed to provide a proper seal is relatively large. Additionally, for certain types of seals, such as those employing sealants, a high starting torque is required to break the seal. The valve actuating means of this invention is designed to produce the enlarged force during the moment of seating and the increased starting torque to break the seal and yet requires a power source having a minimal power output.

As illustrated in FIGURES 3 and 4, the valve operating lever 40 is actuated by, through a series of linkages generally shown at 42, a rotatable motor means 44. The rotatable motor means 44 can be any rotatable power source, for example, a hand-powered fly-wheel, but is preferably a variable speed, unidirectional electric motor which drives an output shaft 46. It is usually necessary to include a simple gear reduction means (not shown) between the electric motor 44 and the output shaft 46 due to the high speed at which the motor operates and the low speed at which the valve operates. Any conventional gear reduction means may be used.

The linkage series 42 includes a crank 48 drivingly connected to the output shaft 46. The crank can be of any type, such as a crank disc or crank arm, the arm embodiment being illustrated in FIGURES 3 and 4. A connecting rod 50 is pivotally attached at one end to the crank 48 at a point displaced from the crank's center of rotation 52, the center of rotation 52 being the axis of the output shaft 46. The pivotal connection 53 between the connecting rod 50 and the crank 48 may be of any conventional type, such as a common pin connection, provided it permits the connecting rod 50 to rotate about the center of the pivotal connection relative to the crank 48. The other end 54 of the connecting rod 50 is pivotally attached to one end 56 of the valve operating lever 40 such as through a pivotal connection 58 similar to the aforementioned pivotal connection 53.

Adjustment means, generally shown at 59, such as a sleeve and threaded shaft or telescoping rod arrangement, is provided at one end of the carnk 48 in order to permit adjustment of the effective length of the crank 48. Similar adjustment means 60, 62 are provided at the end of the connecting rod 50 and the end of the valve operating lever 40, respectively. These adjustment means 59, 60, 62 provide great flexibility to the proper and effective utilization of the valve actuating means of this invention. For example, by relatively simple adjustment of the length of the crank 48 and the valve operating lever 40 the length of valve travel, i.e., the angle through which the valve rotates can be varied without any major revision of the valve actuating means. Furthermore, by adjusting the length of the connecting rod 50 the relative position of the valve member within the valve casing can be varied to accommodate for inadvertant variation in location of the sealing members. This adjustment is accomplished while maintaining the length of valve travel constant. It can be seen that through a relatively simple and minor adjustment a great range of valve operation is available as well as the ability of readjustability in situ where necessary, such as because of wear.

Rotation of the motor 44 causes rotation of the crank 48 which, in turn, causes a combined rotational and translational motion of the connecting rod 50. The forces transmitted from the motor 44 through the crank 48 to the connecting rod 50 are in turn transmitted to the valve shaft 22 through the valve operating lever 40. The lever 40 is caused to rotatably oscillate between two extreme predetermined positions, a first position wherein the flow through the valve 10 is in one direction and a second position wherein the flow through the valve 10 is in a different direction, these two exreme positions being shown by the solid lines in FIGURES 3 and 4.

In order to provide maximum torque on the valve operating lever 40 when the valve member 20 is in a seated position, the crank 48, connecting rod 50, and valve operating lever 40 are arranged so that both ends of the connecting rod 50 are co-linear with the center of rotation 52 of the crank 48 at the instant of seating and unseating of the valve member 20, as may be seen by the solid lines in FIGURES 3 and 4. When both ends of the connecting rod 50 and the center of rotation 52 of the crank 48 are co-linear, the force applied to the end of the valve operating lever 40, and, therefore, the torque applied to the valve shaft 22 is at a maximum. It can be seen that this position is reached twice per revolution of the crank 48, the positions being spaced apart by 180°. By proper choice of the lengths of the crank 48, connecting rod 50 and valve operating lever 40, a 180° rotation of the crank 48 can be converted into a valve member rotation of an arcuate length which is equal to or less than 180°. With the particular valve illustrated in FIGURES 1 and 2 it is desired to have a valve rotation of 90°.

To describe the valve linkage system operation, as illustrated in FIGURES 3 and 4, assume actuation commences with the valve member 20 in a first predetermined position as shown by the solid lines in FIGURE 3 which represents flow communication between a first and second port, for example, ports 12 and 14 and flow communication between a third and fourth port, for example, ports 16 and 18. The motor 44 is energized by any conventional energy source and the motor imparts a clockwise rotation to the crank 48 which in turn produces a combined rotation and translation of the connecting rod 50 as shown by the dotted lines in FIGURE 3. The connecting rod 50 in turn causes the valve operating lever 40 to rotate about the axis of the valve shaft 22 from the position shown by the solid lines in FIGURE 3 through the position shown by the dotted lines in FIGURE 3 to the position shown by the solid lines in FIGURE 4, at which point the motor 44 and crank 48 have rotated through 180°. At this moment the center of rotation 52 and both ends of the connecting rod 50 are co-linear and at the same instant the valve member 20 seats against the sealing members 28, thus effecting flow communication between the first and fourth ports 12 and 18 and between the second and third ports 14 and 16. Continued operation of the motor 44 causes the crank 48 to continue rotating clockwise, to pass through the position illustrated by the dotted lines in FIGURE 4 until the crank has completed a 360° rotation at which time both ends of the connecting rod 50 and the center of rotation of the crank 52 are again co-linear, as shown by the solid lines in FIGURE 3, this representing the first predetermined position of the valve member 20 as described above. It can be seen that with each complete rotation of the motor 44 or crank 48 the valve operating lever 40 and the valve member 20 goes through two extremes of its oscillating motion, each extreme corresponding to the point at which maximum force is applied to the valve member 20, and, therefore, represents the point of seating the valve member 20.

While the above discussion is related to the operation of a single valve 10 it is quite clear that a plurality of valves may be serially connected as through a linkage 64 as shown in FIGURE 5 such that the same valve actuating mechanism can be used to operate a plurality of valves, only two being illustrated.

The linkage 64 is provided with an adjusting means 66 similar in construction to the afore-discussed adjusting means 59. This adjusting means permits variation in operation between the serially connected valves as well as permitting the concurrent adjustment of both valves to maintain predetermined alignment thereof. The first valve operating lever 40 serves as a crank for the second valve and the linkage 64 serves as a connecting rod. By proper adjustment of the length of either or both of these members, the length of travel of the second valve can be varied as well as the relative position of the second valve within its casing. Furthermore, it is quite obvious that while the discussion is related to a valve containing four ports, the valve actuating mechanism can also be employed with a valve having three ports, one port being an inlet port, the other two being outlet ports with the valve directing the flow from the inlet to one of the two outlet ports.

It will be appreciated from the foregoing detailed description that the present invention makes possible the use of a unidirectional continuous motor of minimum power output to operate a multi-port valve by providing maximum force twice per revolution of the motor and corresponding to the instant of seating and unseating of the valve.

It should be understood that while specific forms of this invention have been shown and described above, it will be apparent to those skilled in the art that numerous changes and substitutions of equivalents might be made. For example, the particular linkages and pivotal connecting means are merely illustrative of some elements which can be successfully employed but clearly other elements having the same properties could also be successfully used. Also, while this discussion relates to a continuously rotating motor, a reversible motor could also be employed as an energizing source. Therefore, it is contemplated by the claims which conclude this specification to cover all such modifications as fall within the true spirit and scope of this invention.

What is claimed as new and desired to be secured by Letters Patent of the United States is:

1. In combination,
    (a) a multi-port rotary valve having at least three ports and a valve member mounted on a shaft for rotation within said valve, one end of said shaft having a recess extending transversely thereacross,
    (b) rotatable motor means,
    (c) crank means drivingly connected to said motor means,
    (d) a connecting rod having one end thereof pivotally attached to one end of said crank means, and
    (e) a valve operating lever having one end thereof pivotally attached to the other end of said connecting rod, said lever being received within said recess in said shaft to permit relative transverse motion between said lever and said shaft but to prevent relative rotational motion therebetween thus effecting a rotary driving relationship between said lever and said shaft, said lever being received within said recess at a point on said lever displaced from said one end of said lever, said other end of said connecting rod, said one end of said crank and the center of rotation of said crank being co-linear
        (1) when said lever and said valve members are in a first predetermined position, and
        (2) when said lever and said valve members are in a second predetermined position, said second position being angularly displaced from said first position.

2. The combination as defined in claim 1 wherein said second position is displaced less than 180° from said first position.

3. The combination as defined in claim 1 wherein said second position is displaced 90° from said first position.

4. A combination as defined in claim 1 including means associated with said connecting rod to vary the length of said connecting rod to effect relocation of said first and said second predetermined positions while maintaining the length of the angular displacement therebetween.

5. A combination as defined in claim 1 including means associated with said lever to vary the length of said lever to effect variation in the angular displacement between said first and said second positions.

6. A combination as defined in claim 1 including means associated with said crank to vary the length of said crank to effect variation in the angular displacement between said first and said second positions.

7. In combination:
    (a) a four-way rotary flow control valve, said valve having four equiangularly spaced ports and a valve member mounted on a shaft for rotation within said valve, one end of said shaft having a recess extending transversely thereacross,
    (b) rotatable motor means,
    (c) crank means drivingly connected to said motor means,
    (d) a connecting rod having one end thereof pivotally attached to one end of said crank means, and
    (e) a valve operating lever having one end thereof pivotally attached to the other end of said connecting rod, said lever being received within said recess in said shaft to permit relative transverse motion between said lever and said shaft but to prevent relative rotational motion therebetween thus effecting a rotary driving relationship between said lever and said shaft, said lever being received within said recess at a point on said lever displaced from said one end of said lever, said other end of said connecting rod, said one end of said crank and the center of rotation of said crank being co-linear
        (1) when said lever and said valve member are in a first position to effect flow communication between a first valve port and a second valve port and to effect flow communication between a third valve port and a fourth valve port, and
        (2) when said lever is in a second position to effect flow communication between said first and said fourth valve ports and between said second and said third valve ports.

8. A combination as defined in claim 7 wherein said second position is angularly displaced 90° from said first position.

9. A combination as defined in claim 7 including means associated with said connecting rod to vary the length of said connecting rod to effect relocation of said first and said second predetermined positions while maintaining the length of the angular displacement therebetween.

10. A combination as defined in claim 7 including means associated with said lever to vary the length of said lever to effect variation in the angular displacement between said first and said second positions.

11. A combination as defined in claim 7 including means associated with said crank to vary the length of said crank to effect variation in the angular displacement between said first and said second position.

References Cited by the Examiner

UNITED STATES PATENTS

| 2,274,776 | 3/1942 | Cull | 251—280 |
| 2,365,927 | 12/1944 | Allen | 251—280 |
| 2,460,499 | 2/1949 | Grace | 137—625.43 |
| 2,647,659 | 8/1953 | Berck | 251—279 X |
| 3,013,437 | 12/1961 | Harding | 74—96 |

M. CARY NELSON, *Primary Examiner.*

HENRY T. KLINKSIEK, *Examiner.*